(12) United States Patent
Kim et al.

(10) Patent No.: US 11,372,290 B2
(45) Date of Patent: Jun. 28, 2022

(54) OPTICAL DEVICE

(71) Applicant: LG Chem, Ltd., Seoul (KR)

(72) Inventors: Jung Woon Kim, Daejeon (KR);
Byoung Kun Jeon, Daejeon (KR);
Beom Jin Lee, Daejeon (KR); In Ju Mun, Daejeon (KR); Su Young Ryu, Daejeon (KR); Seong Min Lee, Daejeon (KR); Young Shin Lee, Daejeon (KR); Nam Hun Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/272,997

(22) PCT Filed: Sep. 3, 2019

(86) PCT No.: PCT/KR2019/011278
§ 371 (c)(1),
(2) Date: Mar. 3, 2021

(87) PCT Pub. No.: WO2020/050572
PCT Pub. Date: Mar. 12, 2020

(65) Prior Publication Data
US 2021/0325706 A1 Oct. 21, 2021

(30) Foreign Application Priority Data
Sep. 4, 2018 (KR) .................. 10-2018-0105602

(51) Int. Cl.
*G02F 1/135* (2006.01)
*B60J 7/00* (2006.01)
(Continued)

(52) U.S. Cl.
CPC .......... *G02F 1/1351* (2021.01); *B60J 7/0023* (2013.01); *G02F 1/1337* (2013.01); *G02F 1/133528* (2013.01); *G06T 19/006* (2013.01)

(58) Field of Classification Search
CPC .................................................... G02F 1/1351
See application file for complete search history.

(56) References Cited

U.S. PATENT DOCUMENTS

| | | | |
|---|---|---|---|
| 2004/0212884 A1 | 10/2004 | Satake et al. | |
| 2006/0062934 A1* | 3/2006 | Hayashi | C08J 5/18 428/1.31 |

(Continued)

FOREIGN PATENT DOCUMENTS

| | | |
|---|---|---|
| CN | 1834751 A | 9/2006 |
| CN | 106393922 A | 2/2017 |

(Continued)

OTHER PUBLICATIONS

International Search Report for Application No. PCT/KR2019/011278 dated Dec. 11, 2019.

(Continued)

*Primary Examiner* — Edmond C Lau
(74) *Attorney, Agent, or Firm* — Lerner, David, Littenberg, Krumholz & Mentlik, LLP

(57) ABSTRACT

An optical device includes a first outer substrate; a second outer substrate disposed opposite to the first outer substrate; and an active liquid crystal film or a polarizer, wherein the active liquid crystal film or the polarizer is encapsulated by an encapsulating agent between the first and second outer substrates and wherein a shrinkable film adjacent to any one of the first and second outer substrates is further included. The optical device is capable of varying transmittance. The optical device can be used for various applications such as an eyewear, for example, sunglasses or AR (augmented (Continued)

reality) or VR (virtual reality) eyewears, an outer wall of a building or a sunroof for a vehicle.

17 Claims, 3 Drawing Sheets

(51) Int. Cl.
  *G02F 1/1335* (2006.01)
  *G02F 1/1337* (2006.01)
  *G06T 19/00* (2011.01)

(56) References Cited

U.S. PATENT DOCUMENTS

| | | | |
|---|---|---|---|
| 2006/0291030 | A1 | 12/2006 | Niiyama et al. |
| 2007/0195243 | A1 | 8/2007 | Miyatake et al. |
| 2008/0310020 | A1 | 12/2008 | Hashimoto et al. |
| 2009/0079900 | A1 | 3/2009 | Ohta et al. |
| 2015/0348486 | A1* | 12/2015 | Suzuki .................. G09G 3/3655 345/174 |
| 2016/0062124 | A1 | 3/2016 | Callier et al. |
| 2019/0107742 | A1 | 4/2019 | Jeon et al. |
| 2019/0293853 | A1* | 9/2019 | Ayres .................... G02B 5/1857 |
| 2020/0285107 | A1 | 9/2020 | Park et al. |

FOREIGN PATENT DOCUMENTS

| | | |
|---|---|---|
| JP | H0224630 A | 1/1990 |
| JP | 2006106079 A | 4/2006 |
| JP | 20074085 A | 1/2007 |
| JP | 2007102210 A | 4/2007 |
| JP | 2011232626 A | 11/2011 |
| JP | 2012159695 A | 8/2012 |
| JP | 2016126130 A | 7/2016 |
| JP | 201765945 A | 4/2017 |
| KR | 20060050706 A | 5/2006 |
| KR | 20160002769 A | 1/2016 |
| KR | 20160088741 A | 7/2016 |
| KR | 20170064744 A | 6/2017 |
| KR | 20180003394 A | 1/2018 |
| KR | 20180059370 A | 6/2018 |
| TW | 200426403 A | 12/2004 |
| TW | 200912402 A | 3/2009 |
| WO | 2009038240 A1 | 3/2009 |
| WO | 2014018231 A1 | 1/2014 |

OTHER PUBLICATIONS

Taiwanese Search Report for Application No. TW108131641 dated Jun. 17, 2020.
Supplemental Search Report for U.S. Appl. No. 19/857,588 dated Sep. 23, 2021. 2 pgs.
Search Report dated Mar. 29, 2022 from Office Action for Chinese Application No. 201980055971.7 dated Apr. 6, 2022. 3 pgs. (see p. 1, categorizing the cited references).

* cited by examiner

[Figure 1]
| 10 |
|----|
| 20 |
[Figure 2]
| 110 |
|-----|
| 120 |
| 201 |
| 110 |
[Figure 3]
| 30 |
|----|
| 10 |
| 20 |
| 30 |
[Figure 4]
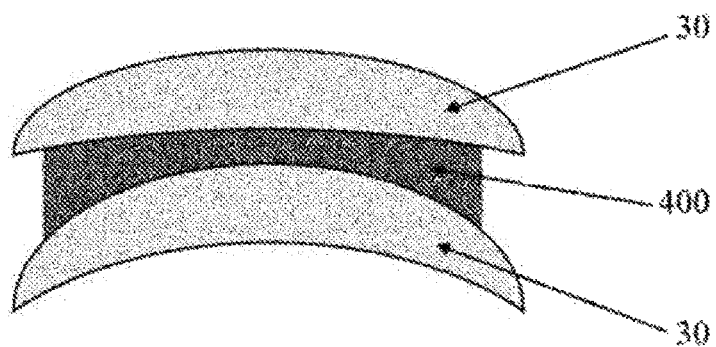
[Figure 5]
| 30 | |
|----|----|
| 40 | 10 |
|    | 20 |
| 30 | |

[Figure 6]
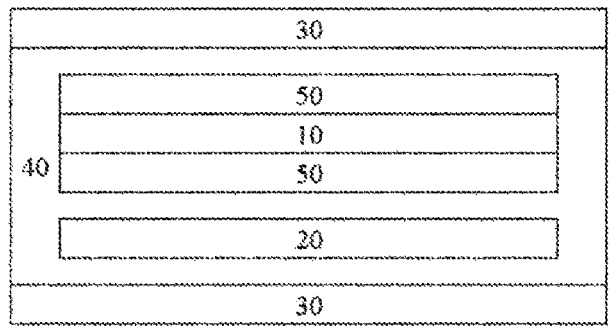
[Figure 7]
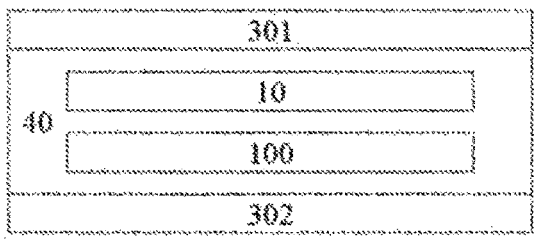
[Figure 8]
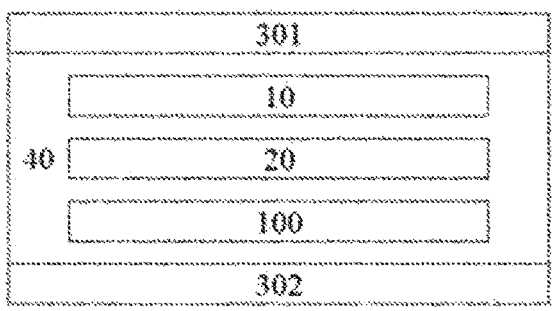
[Figure 9]
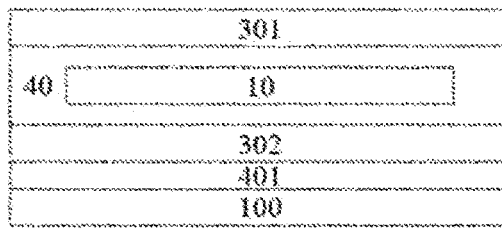

[Figure 10]
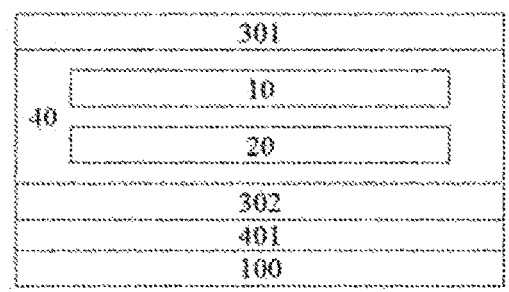
[Figure 11]
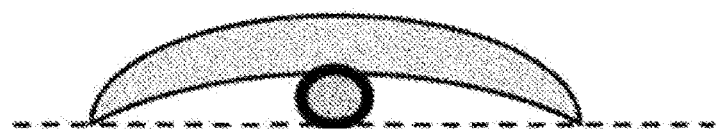

OPTICAL DEVICE

CROSS-REFERENCE TO RELATED APPLICATION

This application is a national phase entry under 35 U.S.C. § 371 of International Application No. PCT/KR2019/011278 filed Sep. 3, 2019 which claims priority from Korean Patent Application No. 10-2018-0105602 filed on Sep. 4, 2018, the disclosure of which are incorporated herein by reference in their entirety.

TECHNICAL FIELD

The present application relates to an optical device.

BACKGROUND ART

Various transmittance-variable films are known, which are designed so that transmittance can be varied using liquid crystal compounds. For example, transmittance-variable films using a so-called GH cell (guest host cell), to which a mixture of a host material and a dichroic dye guest is applied, are known. Such transmittance-variable films are applied to various applications including eyewear such as sunglasses and eyeglasses, outward walls of a building or sunroofs of a vehicle, and the like.

In view of increasing applicability of the transmittance-variable films to various applications, a structure in which a transmittance-variable device or the like is encapsulated may be considered. As an encapsulation method, a method of encapsulating the transmittance-variable device in an autoclave manner or the like, using a hot melting material or other adhesive materials between rigid outer substrates such as glass substrates may be considered.

The autoclave process is a high temperature and high pressure process in which a high temperature of 100° C. or higher and a high pressure of 2 bar or more are typically applied.

When the transmittance-variable film is encapsulated between two outer substrates using this technique, a pressure is applied to the transmittance-variable film, and such a pressure may cause bubbles under high temperature, or high temperature and high humidity conditions, or low temperature conditions, and the like. Also, a hot melting material or other adhesive materials applied to the encapsulation, and the like shrink under conditions such as low temperature conditions, and a negative pressure may be generated on the encapsulated transmittance-variable film by the shrinkage and restoring force of the outer substrates, and the like to cause bubbles. In addition, deformation of the glass substrates may occur while the elastic modulus of the adhesive material is lowered under high temperature conditions, and residual stress may be transmitted to the transmittance-variable film under normal temperature conditions to generate a negative pressure, thereby causing again bubbles. Many defects may occur according to the temperature change of the structure thus encapsulated between rigid substrates, such as a glass substrate, and this problem is more prominent when curved substrates and the like are applied as the rigid substrates.

DISCLOSURE

Technical Problem

The present application provides an optical device. It is an object of the present application to provide an optical device having excellent durability without occurrence of defects such as bubbles or appearance changes under various endurance conditions including temperature change conditions in a structure comprising an active liquid crystal film encapsulated between at least two outer substrates.

Technical Solution

Among physical properties mentioned in this specification, when the measurement temperature or pressure affects the results, the relevant physical properties are measured at normal temperature and normal pressure, unless otherwise specified.

The term normal temperature is a natural temperature without warming or cooling, which may generally be any temperature in a range of about 10° C. to 30° C., or a temperature of about 23° C. or about 25° C. or so. In addition, unless otherwise specified, the unit of temperature herein is ° C.

The term normal pressure is a natural pressure that is not particularly reduced or increased, which generally means a pressure of about 1 atmosphere, such as atmospheric pressure.

The optical device manufactured by the present application is an optical device capable of adjusting transmittance, for example, an optical device capable of at least switching between a transparent mode and a black mode.

The transparent mode is a state where the optical device exhibits relatively high transmittance, and the black mode is a state where the optical device has relatively low transmittance.

In one embodiment, the optical device may have transmittance in the transparent mode of about 30% or more, about 35% or more, about 40% or more, about 45% or more, or about 50% or more. Also, the optical device may have transmittance in the black mode of about 20% or less, about 15% or less, or about 10% or less.

The higher the transmittance in the transparent mode is, the more advantageous it is, and the lower the transmittance in the black mode is, the more advantageous it is, so that each of the upper limit and the lower limit is not particularly limited. In one embodiment, the upper limit of the transmittance in the transparent mode may be about 100, about 95%, about 90%, about 85%, about 80%, about 75%, about 70%, about 65% or about 60%. The lower limit of the transmittance in the black mode may be about 0%, about 1%, about 2%, about 3%, about 4%, about 5%, about 6%, about 7%, about 8%, about 9%, or about 10%.

The transmittance may be linear light transmittance. The term linear light transmittance may be a ratio of, relative to light which is incident on the optical device in a predetermined direction, light (linear light) transmitted through the optical device in the same direction as the incident direction. In one embodiment, the transmittance may be a result of measurement (normal light transmittance) with respect to light incident in a direction parallel to the surface normal of the optical device.

In the optical device of the present application, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

The optical device of the present application is designed to be capable of switching at least between the transparent mode and the black mode. If necessary, the optical device may also be designed to be capable of implementing other modes rather than the transparent and black modes, for example, various third modes, such as a mode which can represent any transmittance between the transmittance of the transparent mode and the transmittance of the black mode or a patterned mode in which the transmittance is different for each site.

The switching between such modes can be achieved, as the optical device comprises an active liquid crystal film. Here, the active liquid crystal film is a liquid crystal element film capable of switching between at least two or more oriented states of light axes, for example, first and second oriented states. Here, the optical axis may mean the long axis direction when the liquid crystal compound included in the active liquid crystal film is a rod type, and may mean the normal direction of the disc plane when it is a discotic type. In addition, for example, in the case where the active liquid crystal film comprises a plurality of liquid crystal compounds whose directions of the optical axes are different from each other in any oriented state, the optical axis of the active liquid crystal film may be defined as an average optical axis, and in this case, the average optical axis may mean the vector sum of the optical axes of the liquid crystal compounds.

The oriented state of the active liquid crystal film can be controlled through the application of external energy. Here, the external energy may be in various forms, and in one embodiment, may be a voltage. For example, the active liquid crystal film may have any one of the first and second oriented states in a state without voltage application, and may be switched to another oriented state when a voltage is applied.

The black mode may be implemented in any one of the first and second oriented states, and the transparent mode may be implemented in another oriented state. For convenience, it is described herein that the black mode is implemented in the first state.

The active liquid crystal film may comprise at least a liquid crystal layer containing a liquid crystal compound. In one embodiment, the liquid crystal layer is a so-called guest-host liquid crystal layer, which may be a liquid crystal layer comprising a liquid crystal compound and an anisotropic dye. Such a liquid crystal layer is a liquid crystal layer using a so-called guest host effect, which is a liquid crystal layer in which the anisotropic dye is aligned according to an alignment direction of the liquid crystal compound (hereinafter, may be referred to as a liquid crystal host). The alignment direction of the liquid crystal host may be adjusted depending on whether or not external energy is applied.

The type of the liquid crystal host used in the liquid crystal layer is not particularly limited, and a general type of liquid crystal compound applied to realize the guest host effect may be used.

For example, as the liquid crystal host, a smectic liquid crystal compound, a nematic liquid crystal compound, or a cholesteric liquid crystal compound may be used. In general, a nematic liquid crystal compound may be used. The term nematic liquid crystal compound means a liquid crystal compound which has no regularity with respect to the position of the liquid crystal molecules but is capable of arranging all of them in the molecular axis direction, and such a liquid crystal compound may be in a rod form or may be in a discotic form.

As such a nematic liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase from a nematic phase, can be selected. In one embodiment, the clearing point or phase transition point may be about 160° C. or less, about 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than 3 or more than 7, or may be less than −2 or less than −3.

The liquid crystal compound may also have optical anisotropy ($\beta n$) of about 0.01 or more, or about 0.04 or more. In another example, the optical anisotropy of the liquid crystal compound may be about 0.3 or less, or about 0.27 or less.

Liquid crystal compounds that can be used as the liquid crystal host of the guest host liquid crystal layer are well known to those skilled in the art, whereby the liquid crystal compound can be freely selected from them.

When the liquid crystal layer is a guest host liquid crystal layer, it comprises an anisotropic dye together with the liquid crystal host. The term "dye" may mean a material capable of intensively absorbing and/or modifying light in at least a part or the entire range in a visible light region, for example, a wavelength range of 380 nm to 780 nm, and the term "anisotropic dye" may mean a material capable of anisotropic absorption of light in at least a part or the entire range of the visible light region.

As the anisotropic dye, for example, known dyes known to have properties that can be aligned according to the aligned state of the liquid crystal host may be selected and used. For example, azo dyes or anthraquinone dyes and the like may be used as the anisotropic dye, and the liquid crystal layer may also comprise one or two or more dyes in order to achieve light absorption in a wide wavelength range.

A dichroic ratio of the anisotropic dye may be appropriately selected in consideration of the purpose. For example, the anisotropic dye may have a dichroic ratio of 5 or more to 20 or less. For example, in the case of a p-type dye, the term "dichroic ratio" may mean a value obtained by dividing absorption of polarized light parallel to the long axis direction of the dye by absorption of polarized light parallel to the direction perpendicular to the long axis direction. The anisotropic dye may have the dichroic ratio at least at some wavelengths or at any one wavelength or full range in the wavelength range of the visible region, for example, in the wavelength range of about 380 nm to 780 nm or about 400 nm to 700 nm.

The content of the anisotropic dye in the liquid crystal layer may be appropriately selected in consideration of the purpose. For example, the content of the anisotropic dye may be selected in a range of 0.1 to 10 weight % based on the total weight of the liquid crystal host and the anisotropic dye. The ratio of the anisotropic dye may be changed in consideration of the desired transmittance and the solubility of the anisotropic dye in the liquid crystal host, and the like.

The liquid crystal layer basically comprises the liquid crystal host and the anisotropic dye, and may further comprise other optional additives according to a known form, if necessary. As an example of the additive, a chiral dopant or a stabilizer can be exemplified, without being limited thereto.

The thickness of the liquid crystal layer may be appropriately selected in consideration of the purpose, for example, the variable degree of the desired transmittance or the like. In one embodiment, the thickness of the liquid crystal layer may be about 0.01 μm or more, 0.05 μm or more, 0.1 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, or 9.5 μm or more. By controlling the thickness in this manner, it is possible to realize an optical device having a large difference in transmittance between the transparent state and the black state, that is, a device having a large contrast ratio. The thicker the thickness is, the higher the contrast ratio can be realized, and thus it is not particularly limited, but it may be generally about 30 μm or less, 25 μm or less, 20 μm or less, or 15 μm or less.

Such an active liquid crystal layer or the active liquid crystal film comprising the same may switch between a first oriented state and a second oriented state different from the first oriented state. The switching can be controlled, for example, by the application of external energy, such as a voltage. For example, either of the first and second oriented states may be maintained in a state where a voltage is not applied and then switched to another oriented state by voltage application.

In one embodiment, the first and second oriented states may be each selected from a horizontal orientation, vertical orientation, twisted nematic orientation, or cholesteric orientation state. For example, in the black mode, the active liquid crystal film or the liquid crystal layer may be at least in horizontal orientation, twisted nematic orientation or cholesteric orientation, and in the transparent mode, the active liquid crystal film or liquid crystal layer may be in a vertically oriented state, or a horizontally oriented state having optical axes of directions different from the horizontal orientation of the black mode. The active liquid crystal film may be an element of a normally black mode in which the black mode is implemented in a state where a voltage is not applied, or may implement a normally transparent mode in which the transparent mode is implemented in a state where a voltage is not applied.

A method of confirming which direction the optical axis of the liquid crystal layer is formed in the oriented state of the liquid crystal layer is known. For example, the direction of the absorption axis or the transmission axis of the liquid crystal layer can be measured by using another polarizing plate whose optical axis direction is known, which can be measured using a known measuring instrument, for example, a polarimeter such as Pascal 2000 from Jascp.

A method of realizing the active liquid crystal film of the normally transparent or black mode by adjusting the dielectric constant anisotropy of the liquid crystal host, the alignment direction of the alignment film for orienting the liquid crystal host, and the like is known.

The active liquid crystal film may comprise two base films disposed opposite to each other and the active liquid crystal layer existing between the two base films.

The active liquid crystal film may further comprise spacers for maintaining an interval of the two base films between the two base films and/or a sealant for attaching the base films in a state where the interval of two base films disposed opposite to each other is maintained. As the spacer and/or the sealant, a known material can be used without any particular limitation.

As the base film, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the base film, if necessary.

As the base film, a film having a phase difference in a predetermined range may be used. In one embodiment, the base film may have a front phase difference of 100 nm or less. In another example, the front phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 5 nm or less, about 4 nm or less, about 3 nm or less, about 2 nm or less, about 1 nm or less, or about 0.5 nm or less. In another example, the front phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of a thickness direction phase difference of the base film may be, for example, 200 nm or less. The absolute value of the thickness direction phase difference may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 10 nm or less, 5 nm or less, 4 nm or less, 3 nm or less, 2 nm or less, 1 nm or less, or 0.5 nm or less, and may be 0 nm or more, 10 nm or more, 20 nm or more, 30 nm or more, 40 nm or more, 50 nm or more, 60 nm or more, 70 nm or more, or 75 nm or more. The thickness direction phase difference may be negative, or may be positive, if the absolute value is within the above range, and for example, may be negative.

In this specification, the front phase difference (Rin) is a numerical value calculated by Equation 1 below, and the thickness direction phase difference (Rth) is a numerical value calculated by Equation 2 below. Unless otherwise specified, the reference wavelength of the front and thickness direction phase differences or refractive indexes referred to herein is about 550 nm.

$$\text{Front phase difference } (Rin) = d \times (nx - ny) \quad \text{[Equation 1]}$$

$$\text{Thickness direction phase difference } (Rth) = d \times (nz - ny) \quad \text{[Equation 2]}$$

In Equations 1 and 2, d is the thickness of the base film, nx is the refractive index in the slow axis direction of the base film, ny is the refractive index in the fast axis direction of the base film, and nz is the refractive index in the thickness direction of the base film.

When the base film is optically anisotropic, the angle formed by the slow axes of the base films disposed opposite to each other may be, for example, in a range of about −10 degrees to 10 degrees, in a range of −7 degrees to 7 degrees, in a range of −5 degrees to 5 degrees or in a range of −3 degrees to 3 degrees, or may be approximately parallel.

The angle formed by the slow axis of the base film and a light absorption axis of a polarizer to be described below may be, for example, in a range of about −10 degrees to 10 degrees, in a range of −7 degrees to 7 degrees, in a range of −5 degrees to 5 degrees or in a range of −3 degrees to 3 degrees, or may be approximately parallel, or may be in a range of about 80 degrees to 100 degrees, in a range of about 83 degrees to 97 degrees, in a range of about 85 degrees to 95 degrees or in a range of about 87 degrees to 92 degrees, or may be approximately vertical.

It is possible to realize the optically excellent and uniform transparent and black modes through the phase difference adjustment or the arrangement of the slow axes.

The base film may have a coefficient of thermal expansion of 100 ppm/K or less. In another example, the coefficient of thermal expansion may be 95 ppm/K or less, 90 ppm/K or less, 85 ppm/K or less, 80 ppm/K or less, 75 ppm/K or less, 70 ppm/K or less, or 65 ppm/K or less, or may be 10 ppm/K or more, 20 ppm/K or more, 30 ppm/K or more, 40 ppm/K or more, 50 ppm/K or more, or 55 ppm/K or more. For example, the coefficient of thermal expansion of the base film may be measured in accordance with the provisions of ASTM D696, may be calculated by tailoring the film in the form provided in the relevant standard and measuring the change in length per unit temperature, or may be measured by a known method such as TMA (thermomechanic analysis).

As the base film, a base film having an elongation at break of 90% or more may be used. The elongation at break may be 95% or more, 100% or more, 105% or more, 110% or more, 115% or more, 120% or more, 125% or more, 130% or more, 135% or more, 140% or more, 145% or more, 150% or more, 155% or more, 160% or more, 165% or more, 170% or more, or 175% or more, and may be 1,000% or less, 900% or less, 800% or less, 700% or less, 600% or less, 500% or less, 400% or less, 300% or less, or 200% or less. The elongation at break of the base film may be measured in accordance with ASTM D882 standard, and may be measured by tailoring the film in the form provided by the corresponding standard and using equipment capable of measuring stress-strain curve (capable of simultaneously measuring force and length).

By selecting the base film to have the coefficient of thermal expansion and/or elongation at break, an optical device having excellent durability can be provided.

The thickness of the base film is not particularly limited, and for example, may be in a range of about 50 μm to 200 μm or so.

In the active liquid crystal film, a conductive layer and/or an alignment film may be present on one side of the base film, for example, on the side facing the active liquid crystal layer.

The conductive layer present on the side of the base film is a constitution for applying a voltage to the active liquid crystal layer, to which a known conductive layer can be applied without any particular limitation. As the conductive layer, for example, a conductive polymer, a conductive metal, a conductive nanowire, or a metal oxide such as ITO (indium tin oxide) can be applied. Examples of the conductive layer that can be applied in the present application are not limited to the above, and all kinds of conductive layers known to be applicable to the active liquid crystal film in this field can be used.

In one embodiment, an alignment film exists on the side of the base film. For example, a conductive layer may first be formed on one side of the base film, and an alignment film may be formed on its upper part.

The alignment film is a constitution for controlling orientation of the liquid crystal host included in the active liquid crystal layer, and a known alignment film can be applied without particular limitation. As the alignment film known in the industry, there is a rubbing alignment film or a photo alignment film, and the like, and the alignment film that can be used in the present application is the known alignment film, which is not particularly limited.

The alignment direction of the alignment film can be controlled to achieve the orientation of the above-described optical axis. For example, the alignment directions of two alignment films formed on each side of two base films disposed opposite to each other may form an angle in a range of about −10 degrees to 10 degrees, an angle in a range of −7 degrees to 7 degrees, an angle in a range of −5 degrees to 5 degrees or an angle in a range of −3 degrees to 3 degrees to each other, or may be approximately parallel to each other. In another example, the alignment directions of the two alignment layers may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or may be approximately perpendicular to each other.

Since the direction of the optical axis of the active liquid crystal layer is determined in accordance with such an alignment direction, the alignment direction can be confirmed by checking the direction of the optical axis of the active liquid crystal layer.

The shape of the active liquid crystal film having such a structure is not particularly limited, which may be determined according to the application of the optical device, and is generally in the form of a film or a sheet.

The optical device may comprise a polarizer. The polarizer may be included instead of the active liquid crystal film, or may be included with the active liquid crystal film. As the polarizer, for example, an absorbing linear polarizer, that is, a polarizer having a light absorption axis formed in one direction and a light transmission axis formed approximately perpendicular thereto may be used.

Assuming that the blocking state is implemented in the first oriented state of the active liquid crystal layer, the polarizer may be disposed in the optical device such that the angle formed by an average optical axis (vector sum of optical axes) of the first oriented state and the light absorption axis of the polarizer is 80 degrees to 100 degrees or 85 degrees to 95 degrees, or it is approximately perpendicular, or may be disposed in the optical device such that it is 35 degrees to 55 degrees or about 40 degrees to 50 degrees or approximately 45 degrees.

When the alignment direction of the alignment film is used as a reference, the alignment directions of the alignment films formed on each side of the two base films of the active liquid crystal film disposed opposite to each other as described above may form, to each other, an angle in a range of about −10 degrees to 10 degrees, an angle in a range of −7 degrees to 7 degrees, an angle in a range of −5 degrees to 5 degrees or an angle in a range of −3 degrees to 3 degrees, or in the case of being approximately parallel to each other, the angle formed by the alignment direction of any one of the two alignment films and the light absorption axis of the polarizer may be 80 degrees to 100 degrees or 85 degrees to 95 degrees, or may be approximately perpendicular.

In another example, the alignment directions of the two alignment films may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or in the case of being approximately vertical to each other, the angle formed by the alignment direction of the alignment film disposed closer to the polarizer of the two alignment films and the light absorption axis of the polarizer may be 80 degrees to 100 degrees or 85 degrees to 95 degrees, or may be approximately perpendicular.

For example, as shown in FIG. 1, the active liquid crystal film (10) and the polarizer (20) may be disposed in a state of being laminated on each other such that the optical axis (average optical axis) of the first alignment direction in the active liquid crystal film (10) and the light absorption axis of the polarizer (20) become the above relationship.

In one embodiment, when the polarizer (20) is a polarizing coating layer to be described below, a structure in which the polarizing coating layer is present inside the active liquid crystal film can be realized. For example, as shown in FIG. 2, a structure in which the polarizing coating layer (201) is present between any one base film (110) of the base films (110) of the active liquid crystal film and the active liquid crystal layer (120) can be realized. For example, the conductive layer, the polarizing coating layer (201) and the alignment film as described above may be sequentially formed on the base film (110).

The kind of the polarizer that can be applied in the optical device of the present application is not particularly limited. For example, as the polarizer, a conventional material used in conventional LCDs or the like, such as a PVA (poly(vinyl alcohol)) polarizer, or a polarizer implemented by a coating method such as a polarizing coating layer comprising lyotropic liquid crystals (LLCs) or reactive mesogens (RMs) and a dichroic dye can be used. In this specification, the polarizer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of 30 to 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only each one of the active liquid crystal film and the polarizer as described above. Thus, the optical device may comprise only one active liquid crystal film and may comprise only one polarizer.

The optical device may further comprise two outer substrates disposed opposite to each other. In this specification, one of the two outer substrates may be referred to as a first outer substrate and the other may be referred to as a second outer substrate for the sake of convenience, but the first and second representations do not define the order or vertical relationship of the outer substrates. In one embodiment, the polarizer included together with the active liquid crystal film may be encapsulated between the two outer substrates. Such encapsulation may be performed using an adhesive film. For example, as shown in FIG. 3, the active liquid crystal film (10) and the polarizer (20) may exist between the two substrates (30) disposed opposite to each other.

As the outer substrate, for example, an inorganic substrate made of glass or the like, or a plastic substrate can be used. As the plastic substrate, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the outer substrate, if necessary.

As the outer substrate, a substrate having a coefficient of thermal expansion of 100 ppm/K or less may be used. In another example, the coefficient of thermal expansion may be 95 ppm/K or less, 90 ppm/K or less, 85 ppm/K or less, 80 ppm/K or less, 75 ppm/K or less, 70 ppm/K or less, 65 ppm/K or less, 60 ppm/K or less, 50 ppm/K or less, 40 ppm/K or less, 30 ppm/K or less, 20 ppm/K or less, or 15 ppm/K or less, or may be 1 ppm/K or more, 2 ppm/K or more, 3 ppm/K or more, 4 ppm/K or more, 5 ppm/K or more, 6 ppm/K or more, 7 ppm/K or more, 8 ppm/K or more, 9 ppm/K or more, or 10 ppm/K or more.

The methods of measuring the coefficient of thermal expansion and the elongation at break of the outer substrate are the same as the methods of measuring the coefficient of thermal expansion and elongation at break of the base film as described above.

By selecting the outer substrate to have such a coefficient of thermal expansion and/or elongation at break, an optical device having excellent durability can be provided.

The thickness of the outer substrate as above is not particularly limited, and for example, may be about 0.3 mm or more. In another example, the thickness may be about 0.5 mm or more, about 1 mm or more, about 1.5 mm or more, or about 2 mm or more or so, and may also be 10 mm or less, 9 mm or less, 8 mm or less, 7 mm or less, 6 mm or less, 5 mm or less, 4 mm or less, or 3 mm or less or so.

The outer substrate may be a flat substrate or may be a curved substrate having a curved surface shape. For example, the two outer substrates may be simultaneously flat substrates, simultaneously have a curved surface shape, or any one may be a flat substrate and the other may be a substrate having a curved surface shape.

In addition, here, in the case of having the curved surface shape at the same time, the respective curvatures or curvature radii may be the same or different.

In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

Also, with respect to the substrate, for example, when the curvatures or the curvature radii at the front surface and the back surface are different from each other, the curvature or the curvature radius of the outer substrate referred to in this specification may mean a curvature or a curvature radius of a surface that two outer substrates disposed in the optical device face each other. Therefore, the curvature or curvature radius of the surface that faces a second outer substrate in the case of a first outer substrate, and the curvature or curvature radius of the surface that faces the first outer substrate in the case of the second outer substrate, may be a reference. Furthermore, when the relevant surface has portions that the curvatures or curvature radii are not constant and different, the largest curvature or curvature radius, or the smallest curvature or curvature radius, or the average curvature or average curvature radius may be a reference.

Both of the substrates may have a difference in curvature or curvature radius within 10%, within 9%, within 8%, within 7%, within 6%, within 5%, within 4%, within 3%, within 2% or within 1%. When a large curvature or curvature radius is CL and a small curvature or curvature radius is CS, the difference in curvature or curvature radius is a value calculated by 100×(CL−CS)/CS. In addition, the lower limit of the difference in curvature or curvature radius is not particularly limited. Since the differences in curvatures or curvature radii of two outer substrates can be the same, the difference in curvature or curvature radius may be 0% or more, or more than 0%.

The control of such a curvature or curvature radius is useful in a structure in which an active liquid crystal film and/or a polarizer are encapsulated by an adhesive film as in the optical device of the present application.

When both the first and second outer substrates are curved surfaces, both curvatures in the optical device may have the same sign. In other words, the two outer substrates may be bent in the same direction. That is, in the above case, both the center of curvature of the first outer substrate and the center of curvature of the second outer substrate exist in the same portion of the upper part and the lower part of the first and second outer substrates. FIG. 4 is a side illustration that an encapsulation portion (400) comprising an active liquid crystal film exists between first and second outer substrates (30), where the center of the curvature in both the first and second outer substrates (30) exists at the lower part in the drawing.

The specific range of each curvature or curvature radius of the first and second outer substrates is not particularly limited. In one embodiment, the curvature radius of each substrate may be 100R or more, 200R or more, 300R or more, 400R or more, 500R or more, 600R or more, 700R or more, 800R or more, or 900R or more, or may be 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or 1,050R or less. Here, R denotes a curved gradient of a circle having a radius of 1 mm. Thus, here, for example, 100R is the degree of curvature of a circle with a radius of 100 mm or the curvature radius for such a circle. Of course, in the case of a flat surface, the curvature is zero and the curvature radius is infinite.

The first and second outer substrates may have the same or different curvature radii in the above range. In one embodiment, when the curvatures of the first and second outer substrates are different from each other, the curvature radius of the substrate having a large curvature among them may be within the above range.

In one embodiment, when the curvatures of the first and second outer substrates are different from each other, a substrate having a large curvature among them may be a substrate that is disposed in the gravity direction upon using the optical device. In the present application, a substrate disposed in the gravity direction in the state of using the optical device among the two outer substrates may be referred to as a lower substrate, and the other substrate may be referred to as an upper substrate.

That is, for the encapsulation, an autoclave process using an adhesive film may be performed, as described below, and in this process, high temperature and high pressure are usually applied. However, in some cases, such as when the adhesive film applied to the encapsulation is stored at a high temperature for a long time after such an autoclave process, some re-melting or the like occurs, so that there may be a problem that the outer substrates are widening. If such a phenomenon occurs, a force may act on the encapsulated active liquid crystal film and/or polarizer, and bubbles may be formed inside.

However, when the curvatures or curvature radii between the substrates are controlled as described above, the net force which is the sum of the restoring force and the gravity may act to prevent the widening and also to withstand the same process pressure as the autoclave, even if the adhesion force by the adhesive film is lowered.

The optical device may further comprise an adhesive film encapsulating the active liquid crystal film and/or the polarizer in the outer substrates. In this specification, the adhesive film may also be referred to as an encapsulating agent. For example, as shown in FIG. 5, the adhesive film (40) may be present between the outer substrate (30) and the active liquid crystal film (10), between the active liquid crystal film (10) and the polarizer (20) and/or between the polarizer (20) and the outer substrate (30).

In addition, the adhesive film may be present on the sides of the active liquid crystal film (10) and the polarizer (20), and may be present, appropriately, on all sides.

That is, the adhesive film may be present on the upper part and the lower part, and all sides of the active liquid crystal film and/or polarizer.

The adhesive film may encapsulate the active liquid crystal film (10) and the polarizer (20) while attaching the outer substrate (30) and the active liquid crystal film (10), the active liquid crystal film (10) and the polarizer (20), and the polarizer (20) and the outer substrate (30) to each other.

For example, after laminating outer substrates, an active liquid crystal film, a polarizer and an adhesive film according to a desired structure, the above structure can be realized by a method of pressing them in a vacuum state.

As the adhesive film, a known material can be used without any particular limitation, which can be selected, for example, among a known thermoplastic polyurethane adhesive film (TPU: thermoplastic polyurethane), TPS (thermoplastic starch), polyamide adhesive film, acrylic adhesive film, polyester adhesive film, EVA (ethylene vinyl acetate) adhesive film, polyolefin adhesive film such as polyethylene or polypropylene, or polyolefin elastomer film (POE film), and the like.

As the adhesive film, a film having a phase difference in a predetermined range may be used. In one embodiment, the adhesive film may have a front phase difference of 100 nm or less. In another example, the front phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 9 nm or less, about 8 nm or less, about 7 nm or less, about 6 nm or less, about 5 nm or less, about 4 nm or less, about 3 nm or less, about 2 nm or less, or about 1 nm or less. The front phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of the thickness direction phase difference of the adhesive film may be, for example, 200 nm or less. In another example, the absolute value may be about 190 nm or less, 180 nm or less, 170 nm or less, 160 nm or less, 150 nm or less, 140 nm or less, 130 nm or less, 120 nm or less, or 115 nm or less, or may be 0 nm or more, 10 nm or more, 20 nm or more, 30 nm or more, 40 nm or more, 50 nm or more, 60 nm or more, 70 nm or more, 80 nm or more, or 90 nm or more. The thickness direction phase difference may be negative, or may be positive, as long as it has an absolute value within the range.

The front phase difference (Rin) and the thickness direction phase difference (Rth) of the adhesive film may be calculated in the same manner, except that in Equations 1 and 2 above, the thickness (d), the refractive index in the slow axis direction (nx), the refractive index in the fast axis direction (ny) and the refractive index in the thickness direction (nz), are substituted with the thickness (d), the refractive index in the slow axis direction (nx), the refractive index in the fast axis direction (ny) and the refractive index in the thickness direction (nz), of the adhesive film, respectively, to calculate them.

Here, the thickness of the adhesive film may be a thickness of the adhesive film between the outer substrate (30) and the active liquid crystal layer (10), such as an interval between the two, a thickness of the adhesive film between the active liquid crystal layer (10) and the polarizer (20), such as an interval between the two, and a thickness of the adhesive film between the polarizer (20) and the outer substrate (30), such as an interval between the two.

As the adhesive film, one having a Young's modulus in a range of 0.1 to 100 MPa may be used. The Young's modulus may be measured in accordance with ASTM D882 standard, and may be measured by tailoring the film in the form provided by the corresponding standard and using equipment capable of measuring stress-strain curve (capable of simultaneously measuring force and length).

By selecting the adhesive film to have such a Young's modulus, an optical device with excellent durability can be provided.

The thickness of the adhesive film as above is not particularly limited, which may be, for example, in a range of about 200 μm to 600 μm or so. Here, the thickness of the adhesive film may be a thickness of the adhesive film between the outer substrate (30) and the active liquid crystal film (10), such as an interval between the two, a thickness of the adhesive film between the active liquid crystal film (10) and the polarizer (20), such as an interval between the two, and a thickness of the adhesive film between the polarizer (20) and the outer substrate (30), such as an interval between the two.

The optical device may further comprise a buffer layer. Such a buffer layer may be present on one side or both sides of the active liquid crystal film. FIG. 6 shows a structure in which the buffer layer (50) is present on both sides of the active liquid crystal film (10), but the buffer layer (50) may also be present only on one side of the active liquid crystal film (10).

Such a buffer layer can mitigate the negative pressure caused by the difference in the coefficient of thermal expansion between layers in a structure in which the active liquid crystal film is encapsulated by an adhesive film, and enable so that a more durable device can be realized.

In one embodiment, as the buffer layer, a layer having a Young's modulus of 1 MPa or less may be used. In another example, the Young's modulus of the buffer layer may be 0.9 MPa or less, 0.8 MPa or less, 0.7 MPa or less, 0.6 MPa or less, 0.6 MPa or less, 0.1 MPa or less, 0.09 MPa or less, 0.08 MPa or less, 0.07 MPa or less, or 0.06 MPa or less. In another example, the Young's modulus is about 0.001 MPa or more, 0.002 MPa or more, 0.003 MPa or more, 0.004 MPa or more, 0.005 MPa or more, 0.006 MPa or more, 0.007 MPa or more, 0.008 MPa or more, 0.009 MPa or more, 0.01 MPa or more, 0.02 MPa or more, 0.03 MPa or more, 0.04 MPa or more, or 0.045 MPa or more. Here, the measurement method of the Young's modulus is the same as the above-mentioned measuring method of the adhesive film.

As the buffer layer, a transparent material showing the above-mentioned Young's modulus may be used without particular limitation, and for example, an acrylate-based, urethane-based, rubber-based or silicon-based oligomer or polymer material, and the like can be used.

The thickness of the buffer layer is not particularly limited, which may be selected within a range that can effectively reduce the negative pressure generated inside the device by exhibiting the Young's modulus in the above range.

The optical device of the present application may further comprise a shrinkable film. That is, the optical device of the present application may comprise an active liquid crystal film and/or a polarizer encapsulated by an encapsulating agent between the first and second outer substrates, as described above, wherein it may further comprise a shrinkable film present adjacent to any one of the first and second outer substrates.

The shrinkable film may also be present adjacent to at least one of the first and second outer substrates, and two or more shrinkable films may also be present adjacent to both substrates. When one shrinkable film is present, the one shrinkable film may be present adjacent to the lower outer substrate as described above.

The shrinkable film may be present inside or outside the first or second outer substrate. Here, the inside of the outer substrate may mean a surface facing the active liquid crystal film in the optical device among both major surfaces of the outer substrate, and the outside may mean the opposite major surface.

In one embodiment, the optical device may further comprise an adhesive film between the shrinkable film and the outer substrate. In this case, the shrinkable film may be attached to the aforementioned inside and/or outside surface of the outer substrate through the adhesive film. In this case, the kind of adhesive film that can be applied is not particularly limited, and for example, the same kind of adhesive film as that applied as the encapsulating agent may be used. Thus, for example, the adhesive film may be the aforementioned polyurethane adhesive film (TPU: thermoplastic polyurethane), TPS (thermoplastic starch), polyamide adhesive film, acrylic adhesive film, polyester adhesive film, EVA (ethylene vinyl acetate) adhesive film, polyolefin adhesive film such as polyethylene or polypropylene, or polyolefin elastomer film, and the like.

FIGS. 7 to 10 are examples in which the shrinkable film (100) exists adjacent to the second outer substrate (302), which is a lower substrate, respectively.

FIGS. 7 and 8 are a structure including an active liquid crystal film (10) and/or a polarizer (20) encapsulated with an encapsulating agent (40) between a first outer substrate (301), which is an upper substrate, and a second outer substrate (302) and a structure that in the above structure, a shrinkable film is attached to the inside of the second outer substrate (302) by an adhesive film forming the encapsulating agent (40), and FIGS. 9 and 10 are a structure including an active liquid crystal film (10) and/or a polarizer (20) encapsulated with an encapsulating agent (40) between a first outer substrate (301), which is an upper substrate, and a second outer substrate (302) and a structure that in the above structure, a shrinkable film is attached to the outside of the second outer substrate (302) by an adhesive film (401).

In the present application, by introducing the shrinkable film as described above, the negative pressure that may occur in an encapsulated element (active liquid crystal film and/or polarizer) even by an autoclave process for manufacturing an optical device, or an environmental change such as a temperature change after manufacture can be minimized, and the defects such as white spots caused by bubbles and the like can be prevented.

In the present application, the term shrinkable film may mean a film that exhibits a desired low temperature and/or high temperature shrinkage ratio in at least any direction.

In one embodiment, the shrinkable film may have a shrinkage ratio at −40° C. in a range of 0.001% to 10%. The shrinkage ratio may be 0.005% or more, 0.01% or more, 0.02% or more, 0.03% or more, 0.04% or more, 0.05% or more, 0.06% or more, 0.07% or more, 0.08% or more, 0.09% or more, 0.1% or more, 0.15% or more, 0.2% or more, 0.25% or more, 0.3% or more, 0.35% or more, 0.4% or more, 0.45% or more, 0.5% or more, 0.55% or more, 0.6% or more, 0.65% or more, 0.7% or more, 0.75% or more, 0.8% or more, 0.85% or more, 0.9% or more, 0.95% or more, 1% or more, 1.05% or more, 1.1% or more, 1.15% or more, 1.2% or more, 1.25% or more, or 1.3% or more. In addition, the shrinkage ratio may also be 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5, 2% or less, or 1.5% or less.

In one embodiment, the shrinkable film may have a shrinkage ratio at 90° C. in a range of 0.001% to 10%. The shrinkage ratio may be 0.005% or more, 0.01% or more, 0.02% or more, 0.03% or more, 0.04% or more, 0.05% or more, 0.06% or more, 0.07% or more, 0.08% or more, 0.09% or more, 0.1% or more, 0.15% or more, 0.2% or more, 0.25% or more, 0.3% or more, 0.35% or more, 0.4% or more, 0.45% or more, 0.5% or more, 0.55% or more, 0.6% or more, 0.65% or more, 0.7% or more, 0.75% or more, 0.8% or more, 0.85% or more, 0.9% or more, 0.95% or more, 1% or more, 1.05% or more, 1.1% or more, 1.15% or more, 1.2% or more, 1.25% or more, or 1.3% or more. In addition, the shrinkage ratio may also be 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5, 2% or less, or 1.5% or less.

The shrinkage ratio at −40° C. and the shrinkage ratio at 90° C. are the results evaluated in the manner described in Examples to be described below.

In addition, the shrinkage ratios may each be a shrinkage ratio in any one direction of the shrinkable film, and in one embodiment, it may be the largest shrinkage ratio or the smallest shrinkage ratio among the shrinkage ratios found in all directions of the shrinkable film, or an average value of the shrinkage ratios in all the directions. For example, when the shrinkable film is a stretched polymer film described below, the shrinkage ratio may be a so-called shrinkage ratio in the MD (mechanical direction) direction or shrinkage ratio in the TD (transverse direction) direction.

The shrinkable film may be included so that the direction indicating the shrinkage ratio is a predetermined direction. For example, the shrinkable film may be included in the optical device so that the above-described alignment direction of the alignment film or the direction which shows the shrinkage ratio of the shrinkable film with the light absorption axis of the polarizer contained in the optical device forms an angle in a range of −30 degrees to 30 degrees, in a range of −25 degrees to 25 degrees, in a range of −20 degrees to 20 degrees, in a range of −15 degrees to 15 degrees, in a range of −10 degrees to 10 degrees, or in a range of −5 degrees to 5 degrees, or approximately parallel, or may be included in the optical device so that the above-described alignment direction of the alignment film or the direction which shows the shrinkage ratio of the shrinkable film with the light absorption axis of the polarizer contained in the optical device forms an angle in a range of 60 degrees to 120 degrees, in a range of 65 degrees to 115 degrees, in a range of 70 degrees to 110 degrees, in a range of 75 degrees to 105 degrees, in a range of 80 degrees to 100 degrees, or in a range of 85 degrees to 95 degrees, or approximately vertical.

As long as the shrinkable film exhibits such a shrinkage ratio, various films can be used without any particular limitation as the shrinkage film. In one embodiment, the shrinkable film may be a known stretched polymer film. Since this stretched polymer film is produced through the stretching process, it has a property of shrinking under high temperature conditions and/or low temperature conditions. In this case, the shrinkage ratio is determined by a draw ratio in the manufacturing process or the like. In the present application, a film that exhibits the shrinkage ratio as above may be selected from known shrinkable films and used.

An example of the shrinkable film, which is the applicable stretched polymer film, can be exemplified by a cellulose polymer film such as a DAC (diacetyl cellulose) film or a TAC (triacetyl cellulose) film; a COP (cyclo olefin copolymer) film such as a norbornene derivative film, or a polyolefin film such as a PE (polyethylene) film; or a PP (polypropylene) film; an acrylic polymer film such as a PMMA (poly(methyl methacrylate) film or a Pac (polyacrylate) film; a polyester film such as a PC (polycarbonate) film or a PET (poly(ethylene terephthalate)) film; a polyvinyl alcohol series film such as a PVA (polyvinyl alcohol) film; a PES (poly(ether sulfone)) film; a PEEK (polyetheretherketon) film; a PPS (polyphenylsulfone) film; a PEI (polyetherimide) film; a PEN (polyethylenenaphthatlate) film; a PI (polyimide) film; a PSF (polysulfone) film; a PAR (polyarylate) film or a fluororesin film, but is not limited thereto.

The thickness of the shrinkable film is not particularly limited, and an appropriate kind can be selected from the films exhibiting the above-mentioned shrinkage ratio in consideration of the thickness of the desired optical device, and used.

The optical device may further comprise any necessary configuration other than the above configurations, and for example, comprise a known configuration such as a retardation layer, an optical compensation layer, an antireflection layer and a hard coating layer in a proper position.

The method for manufacturing such an optical device applied in the present application is not particularly limited.

For example, the optical device may be manufactured through a laminate prepared by laminating the above-described first outer substrate; a second outer substrate disposed opposite to the first outer substrate; the active liquid crystal film and/or the polarizer encapsulated by the encapsulating agent (the adhesive film) between the first and second outer substrates, the adhesive film forming the encapsulating agent or the adhesive film attaching a shrinkable film to the outer substrate and the shrinkable film according to a desired structure.

That is, the encapsulation can be completed by applying the laminate to a suitable bonding process, such as an autoclave process, and the device can be produced.

The conditions of the autoclave process are not particularly limited, and it may be performed under an appropriate temperature and pressure, for example, depending on the type of the applied adhesive film. The temperature of a typical autoclave process is about 80° C. or more, 90° C. or more, 100° C. or more, and the pressure is 2 atmospheres or more, without being limited thereto. The upper limit of the process temperature may be about 200° C. or less, 190° C. or less, 180° C. or less, or 170° C. or less or so, and the upper limit of the process pressure may be about 10 atmospheres or less, 9 atmospheres or less, 8 atmospheres or less, 7 atmospheres or less, or 6 atmospheres or less or so.

Such an optical device can be used for various applications, and for example, can be used for eyewear such as sunglasses or AR (augmented reality) or VR (virtual reality) eyewear, an outer wall of a building or a sunroof for a vehicle, and the like.

In one embodiment, the optical device itself may be a sunroof for a vehicle.

For example, in an automobile including a body in which at least one opening is formed, the optical device or the sunroof for a vehicle attached to the opening can be mounted and used.

At this time, when the curvatures or curvature radii of the outer substrates are different from each other, a substrate having a smaller curvature radius, that is, a substrate having a larger curvature, can be arranged in the gravity direction.

Advantageous Effects

The present application provides an optical device capable of varying transmittance, and such an optical device can be used for various applications such as eyewear, for example, sunglasses or AR (augmented reality) or VR (virtual reality) eyewear, an outer wall of a building or a sunroof for a vehicle.

BRIEF DESCRIPTION OF DRAWINGS

FIGS. 1 to 6 are exemplary diagrams for explaining optical devices of the present application.

FIGS. 7 to 10 are exemplary diagrams for explaining structures of optical devices to which a shrinkable film is applied.

FIG. 11 is a diagram exemplarily showing a state for comparing performance of Examples and Comparative Examples.

MODE FOR INVENTION

Hereinafter, the present application will be described in detail by way of examples and comparative examples, but the scope of the present application is not limited to the following examples.

1. Measurement of Shrinkage Ratio

The shrinkage ratio of the shrinkable film mentioned herein was measured in the following manner using DMA equipment (Q800) from TA. A specimen was manufactured to have a width of about 5.3 mm and a length of about 10 mm, and the shrinkage ratio was measured after fixing both ends of the specimen in the longitudinal direction to the clamp of the measuring equipment. Here, the length of 10 mm in the specimen is the length excluding the portion fixed to the clamp. After the specimen was fixed to the clamp as described above, it was measured under conditions of preload force of 0.01N and a temperature increase rate of 3.00° C./min or a temperature reduction rate of −3.00° C./min in the controlled force mode. The −40° C. shrinkage ratio $(100\times(L_{-40}-L_O)/L_O)$ was measured through the length $(L_{-40})$ of the specimen after maintaining at −40° C. for 30 minutes and the initial length ($L_O$=10 mm), and the −40° C. shrinkage ratio $(100\times(L_{90}-L_O)/L_O)$ was obtained through the length ($L_{90}$) of the specimen after maintaining at 90° C. for 30 minutes and the initial length ($L_O$=10 mm).

<Measurement Temperature Condition and Time>

Temperature: 25° C. start→90° C. (maintaining for 30 minutes)→25° C. (maintaining for 30 minutes)→−40° C. (maintaining for 30 minutes)→25° C. (maintaining for 30 minutes)

Example 1

The following construction was used for manufacture of an optical device.

Active liquid crystal film: guest-host active liquid crystal film (cell gap: about 12 μm, base film type: PET (poly (ethylene terephthalate) film), liquid crystal/dye mixture type: a mixture of MAT-16-969 liquid crystal from Merck and anisotropic dye (BASF, X12), Polarizer: PVA (polyvinyl alcohol)-based linear absorption polarizer, First outer substrate: 3.85 mm thick glass substrate with a curvature of 2400R Second outer substrate: 0.55 mm thick glass substrate with a curvature of 2400R Encapsulating agent (adhesive film): TPU (thermoplastic polyurethane) adhesive film (thickness: about 0.38 mm, manufacturer: Argotec, product name: ArgoFlex)

Encapsulating agent (OCA): 3M, 8146-5

Shrinkable film: stretched PVA-based polarizing film (MD (mechanical direction) high temperature (90° C.) shrinkage ratio: 1.32%, MD (mechanical direction) low temperature (−40° C.) shrinkage ratio: 1.32%, TD (transverse direction) high temperature (90° C.) shrinkage ratio: 0.17%, TD (transverse direction) low temperature (−40° C.) shrinkage ratio: 0.31%)

The shrinkable film, the TPU adhesive film, the second outer substrate, the OCA encapsulating agent, the active liquid crystal film, the TPU adhesive film and the first outer substrate were sequentially laminated to prepare a laminate.

At the time of manufacturing the laminate, both the convex portions of the first and second outer substrates faced upwards.

In addition, the laminate was manufactured so that in the structure, the MD direction of the shrinkable film (stretched PVA-based polarizing film) was perpendicular to the alignment direction of the liquid crystal alignment film.

Thereafter, the laminate was subjected to an autoclave process at a temperature of about 100° C. and a pressure of 2 atmospheres or so to prepare an optical device.

Example 2

The shrinkable film of Example 1, the TPU adhesive film of Example 1, the second outer substrate of Example 1, the OCA encapsulating agent of Example 1, the active liquid crystal film of Example 1, the OCA encapsulating agent of Example 1, the PVA-based linear absorption polarizer of Example 1; the TPU adhesive film of Example 1 and the first outer substrate of Example 1 were sequentially laminated to prepare a laminate. At the time of manufacturing the laminate, both the convex portions of the first and second outer substrates faced upwards. In addition, the laminate was manufactured such that in the structure, the MD direction of the shrinkable film (stretched PVA-based polarizing film) was perpendicular to the light absorption axis direction of the PVA-based linear absorption polarizer. Thereafter, the laminate was subjected to an autoclave process at a temperature of about 100° C. and a pressure of 2 atmospheres or so to prepare an optical device.

Example 3

A shrinkable film, the TPU adhesive film of Example 1, the second outer substrate of Example 1, the OCA encapsulating agent of Example 1, the active liquid crystal film of Example 1, the OCA encapsulating agent of Example 1, the PVA-based linear absorption polarizer of Example 1; the TPU adhesive film of Example 1 and the first outer substrate of Example 1 were sequentially laminated to prepare a laminate. At the time of manufacturing the laminate, both the convex portions of the first and second outer substrates faced upwards.

Furthermore, when the laminate was manufactured, as the shrinkable film, a biaxially stretched PET (poly(ethylene terephthalate)) film having an MD (mechanical direction) direction high temperature (90° C.) shrinkage ratio of 0.51%, an MD (mechanical direction) direction low temperature (−40° C.) shrinkage ratio of 0.97%, a TD (transverse direction) high temperature (90° C.) shrinkage ratio of 0.51% and a TD (transverse direction) low temperature (−40° C.) shrinkage ratio of 0.97% was used. In addition, the laminate was manufactured such that in the structure, the MD direction of the shrinkable film (stretched PET film) was perpendicular to the light absorption axis direction of the PVA-based linear absorption polarizer. Thereafter, the laminate was subjected to an autoclave process at a temperature of about 100° C. and a pressure of 2 atmospheres or so to prepare an optical device.

Example 4

A shrinkable film, the TPU adhesive film of Example 1, the second outer substrate of Example 1, the OCA encapsulating agent of Example 1, the active liquid crystal film of Example 1, the OCA encapsulating agent of Example 1, the PVA-based linear absorption polarizer of Example 1; the TPU adhesive film of Example 1 and the first outer substrate of Example 1 were sequentially laminated to prepare a laminate. At the time of manufacturing the laminate, both the convex portions of the first and second outer substrates faced upwards.

Furthermore, when the laminate was manufactured, as the shrinkable film, a monoaxially stretched PET (poly(ethylene terephthalate)) film having an MD (mechanical direction) direction high temperature (90° C.) shrinkage ratio of 0.51%, an MD (mechanical direction) direction low temperature (−40° C.) shrinkage ratio of 0.97%, a TD (transverse direction) high temperature (90° C.) shrinkage ratio of 0.01% and a TD (transverse direction) low temperature (−40° C.) shrinkage ratio of 0.01% was used. In addition, the laminate was manufactured such that in the structure, the MD direction of the shrinkable film (stretched PET film) was perpendicular to the light absorption axis direction of the PVA-based linear absorption polarizer. Thereafter, the laminate was subjected to an autoclave process at a temperature of about 100° C. and a pressure of 2 atmospheres or so to prepare an optical device.

Comparative Example 1

An optical device was prepared in the same manner as in Example 1, except that no shrinkable film was applied.

Comparative Example 2

An optical device was prepared in the same manner as in Example 2, except that no shrinkable film was applied.

Comparative Example 3

An optical device was prepared in the same manner as in Example 3, except that no shrinkable film was applied.

Evaluation of Bubble Occurrence

After supporting the center of the concave site of each optical device manufactured in Examples or Comparative Examples as shown in FIG. 11, it was subjected to a heat test followed by a cycling test, and then stored at room temperature for 35 days or so to confirm whether or not white spots were caused by bubbles.

Here, the heat test was performed by holding the optical device at 100° C. for 168 hours, and the cycling test conditions are as follows.

<Cycling Test Conditions>

1 cycle=25° C.→90° C. (maintaining for 4 hours)→−40° C. (maintaining for 4 hours)→25° C.

Temperature change rate: temperature rise 1° C./min, temperature decrease−1° C./min Measured humidity (relative humidity): 90%

Number of repetitions: repeating the 1 cycle 10 times (10 cycles)

In each case, the occurrence of the white spot was confirmed and the results were described in Table 1 below.

In Table 1 below, P means that white spots do not occur, and F means that white spots occur.

TABLE 1

|  | Heat teat | Cycling test |
| --- | --- | --- |
| Example 1 | P | P |
| Example 2 | P | P |
| Example 3 | P | P |
| Example 4 | P | P |

TABLE 1-continued

|  | Heat teat | Cycling test |
|---|---|---|
| Comparative Example 1 | F | F |
| Comparative Example 2 | F | F |
| Comparative Example 3 | F | F |

The invention claimed is:

1. An optical device, comprising:
   a first outer substrate;
   a second outer substrate disposed opposite to the first outer substrate; and
   an active liquid crystal film or a polarizer,
   wherein the active liquid crystal film or the polarizer is encapsulated by an encapsulating agent between the first and second outer substrates and
   wherein a shrinkable film adjacent to any one of the first and second outer substrates is further comprised.

2. The optical device according to claim 1, wherein the active liquid crystal film and the polarizer, which are encapsulated by the encapsulating agent between the first and second outer substrates, are comprised.

3. The optical device according to claim 1, wherein the shrinkable film is present inside or outside the first or second outer substrate.

4. The optical device according to claim 3, further comprising an adhesive film between the shrinkable film and the outer substrate.

5. The optical device according to claim 4, wherein the adhesive film is a polyurethane adhesive film (TPU: thermoplastic polyurethane), TPS (thermoplastic starch), a polyamide adhesive film, an acrylic adhesive film, a polyester adhesive film, an EVA (ethylene vinyl acetate) adhesive film, a polyolefin adhesive film including polyethylene or polypropylene, or a polyolefin elastomer film.

6. The optical device according to claim 1, wherein the shrinkable film has a shrinkage ratio ranging from 0.001% to 10% at −40° C.

7. The optical device according to claim 1, wherein the shrinkable film has a shrinkage ratio ranging from 0.001% to 10% at 90° C.

8. The optical device according to claim 1, wherein the shrinkable film is a stretched polymer film.

9. The optical device according to claim 1, wherein the shrinkable film is a cellulose polymer film, a polyolefin film, an acrylic polymer film, a polyester film, a polyvinyl alcohol series film, a PES (poly(ether sulfone)) film, a PEEK (polyetheretherketon) film, a PPS (polyphenylsulfone) film, a PEI (polyetherimide) film, a PEN (polyethylenenaphthatlate) film, a PI (polyimide) film, a PSF (polysulfone) film, a PAR (polyarylate) film or a fluororesin film.

10. The optical device according to claim 1, wherein at least one of the first and second outer substrates is a curved substrate.

11. The optical device according to claim 1, wherein the first and second outer substrates are both curved substrates.

12. The optical device according to claim 11, wherein a difference in curvature of the first and second outer substrates is within 10%.

13. The optical device according to claim 11, wherein the first and second outer substrates are bent in the same direction.

14. The optical device according to claim 11, wherein the curvature radii of the first and second outer substrates are each 100R or more.

15. The optical device according to claim 1, wherein the encapsulating agent is present on an upper part, a lower part, and all sides of the active liquid crystal film or the polarizer.

16. The optical device according to claim 1, wherein the encapsulating agent is a polyurethane adhesive film (TPU: thermoplastic polyurethane), TPS (thermoplastic starch), a polyamide adhesive film, an acrylic adhesive film, a polyester adhesive film, an EVA (ethylene vinyl acetate) adhesive film, a polyolefin adhesive film including polyethylene or polypropylene, or a polyolefin elastomer film.

17. An optical device, comprising:
   a first outer substrate;
   a second outer substrate disposed opposite to the first outer substrate; and
   an active liquid crystal film, wherein the active liquid crystal film is encapsulated by an encapsulating agent between the first and second outer substrates, wherein the active liquid crystal film comprises two base films disposed opposite to each other and an active liquid crystal layer between the two base films, wherein a shrinkable film adjacent to any one of the first and second outer substrates is further comprised, wherein the encapsulating agent is present on an upper part, a lower part, and a side of the active liquid crystal film, wherein the shrinkable film is present inside or outside the first or second outer substrate and wherein an adhesive film is between the shrinkable film and the outer substrate.

* * * * *